June 2, 1931.  M. J. HOLLOWOOD  1,807,913
HAND TRUCK
Filed July 9, 1925
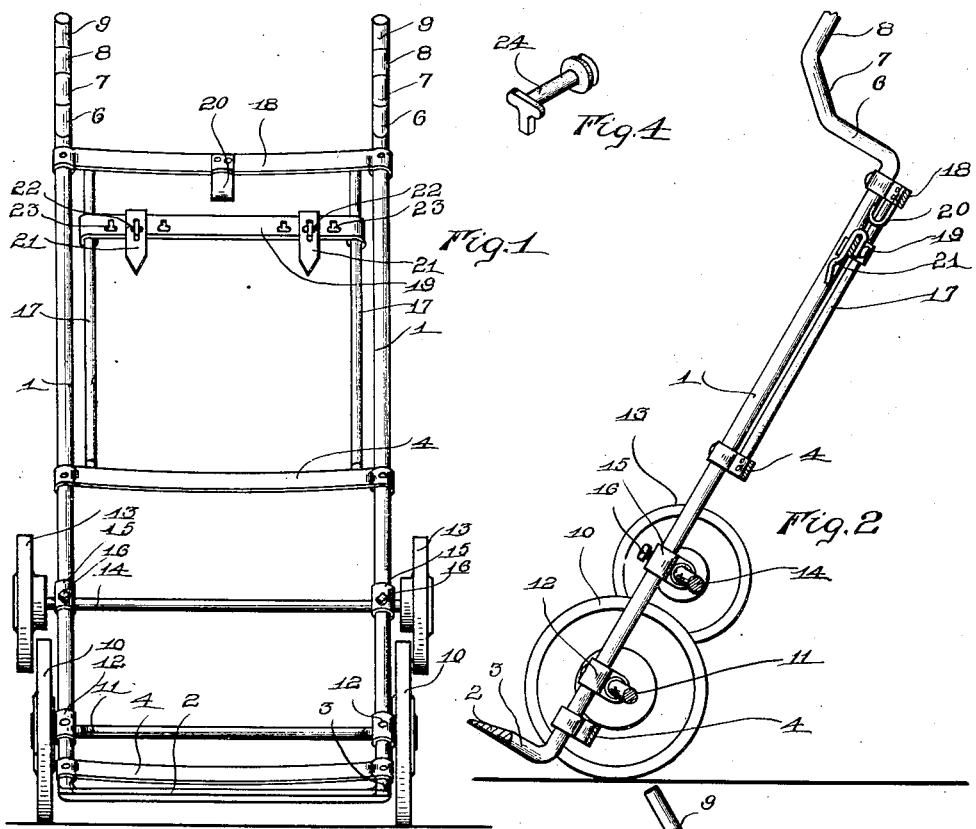
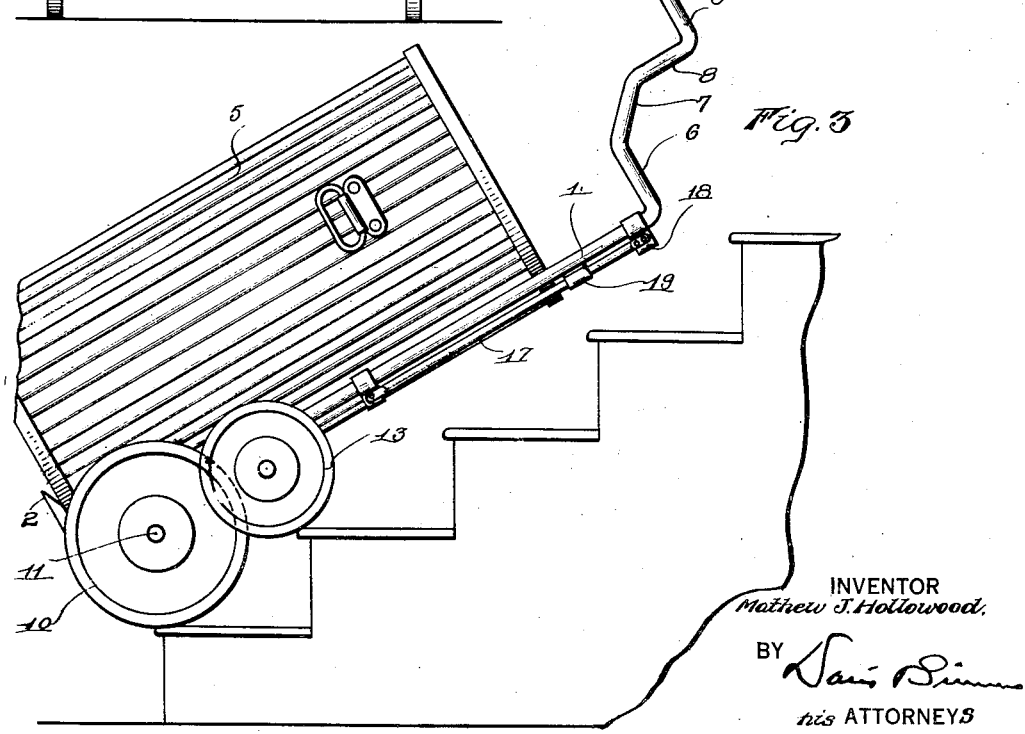
INVENTOR
Mathew J. Hollowood,
BY
his ATTORNEYS Patented June 2, 1931

1,807,913

UNITED STATES PATENT OFFICE

MATHEW J. HOLLOWOOD, OF ROCHESTER, NEW YORK

HAND TRUCK

Application filed July 9, 1925. Serial No. 42,598.

The present invention relates to hand trucks of the type designed for carrying objects up and down stairways. An object of this invention is to provide a hand truck in which the movement of the truck from one tread of a stairway to another is made easier. Another object of the invention is to provide a stair truck having a plurality of gripping elements or handles located at different positions on the truck, so that the user of the truck may use that set of handles which is most convenient for the position of the truck. Another object of the invention is to provide a novel securing means for holding barrels, cans or the like upon the truck.

To these and other ends, the invention consists of certain parts and combinations of parts, all of which will be hereinafter described: the novel features being pointed out in the appended claims.

In the drawings:

Fig. 1 shows the truck in elevation;

Fig. 2 is a vertical section through the center of the truck;

Fig. 3 is a side view of the truck showing its use on a stairway, and

Fig. 4 is a perspective view of one of the keys for holding an engaging device in its adjusted position.

In the illustrated embodiment of the invention, the truck comprises a frame or body having two side bars 1, connected at their forward ends by an article abutment consisting of a cross piece 2 with end pieces 3 at right angles to the cross piece and the side bars. Article rests 4 of which there are but two, in this instance, serve to support the article between the side bars. These article rests are preferably curved to conform to a barrel or receptacle 5.

The side bars are formed at one end with a number of gripping elements or handles indicated at 6, 7, 8 and 9. The handles or grips 6 and 9 are at right angles to the plane of the truck but at different distances from the abutment 2 and at different distances from the plane of the side bars 1. The handles 8 are parallel with the side bars 1 but in a different plane therefrom connecting with the lower ends of the handles 9, and also with the upper ends of the handle 7 arranged at oblique angles to the plane of the side bars 1 and connecting with the upper ends of the handle 6 which extend directly from the ends of the side bars.

The truck is supported by two pairs of wheels. One or the front pair 10 turn on an axle 11 which by brackets 12 is supported on the side bars 1, the shaft 11 being curved to conform to the receptacle supported on the truck body. The other pair of wheels 13 or the rear pair are smaller in diameter than the front pair and are supported on a shaft 14 curved to conform to the receptacle supported on the truck and mounted in brackets 15 which through nuts 16 are adjustable to different positions on the side bars 1 so as to be moved toward and from the wheels 10. The wheels 13 are separated at a greater distance apart than the wheels 10 so that the rear wheels may overlap the front wheels. The purpose of having two sets of wheels, one in rear of the other and smaller in diameter than the front set is to enable the truck to be rolled up a stairway with greater ease, as the smaller wheels may be made to cooperate with the tread of the step above in order to swing the larger wheels to the plane of such tread.

With the purpose in view of providing means for securing the upper end of the barrel 5 upon the truck, two guide bars 17 may be provided connecting the cross bar 4 with the cross bar 18 adjacent the handle. These guides 17 have movable thereon a slide 19 which is adapted to be held in an uppermost position by a latch 20 on the cross bar 18. The slide 19 carriers two receptacle engaging devices 21 which are adjustable toward and from each other on the slide 19, the adjustment, in this instance, being effected by providing the barrel engaging devices with key like openings 22, adapted to register with similar openings 23 in the slide 19. Keys, such as shown at 24 in Fig. 4, are introduced into these openings 22 of the barrel engaging devices 21 and the openings 23 of the slide 19 to hold the engaging devices in their adjusted positions. After a barrel has been placed upon the truck, the slide 19 is released from the latch 20 and moved downwardly to cause the retaining devices 21 to enter the open end of the barrel. The distance between these barrel engaging devices is adjusted to correspond to the diameter of the barrel. It is apparent that these retaining devices will prevent the upper end of the barrel from moving forwardly.

A truck constructed in accordance with this invention is strong and durable in use and inexpensive to manufacture. It has two sets of wheels, one in advance of the other and in overlapping relation, so that the two sets may be made to cooperate with adjacent treads for the purpose of facilitating the movement of the truck up and down a stairway. The truck frame has a number of sets of handles disposed thereon in different positions so that the user of the truck may use that set of handles most convenient for the position of the truck. Provision is made also for securing a barrel or receptacle at its upper end by means which is adjustable to correspond to the size of the barrel or receptacle.

What I claim as my invention and desire to secure by Letters Patent is:

1. A hand truck comprising a frame, supporting wheels arranged adjacent the forward end of the frame, an abutment arranged on the frame adjacent said forward end, a support adjustable on the frame toward and from the abutment, and a pair of receptacle engaging devices adjustably mounted on the support on opposite sides of the longitudinal axis of the truck.

2. A hand truck comprising a frame, an abutment on the frame, a slide guided on the frame toward and from the abutment and receptacle engaging devices adjustable toward and from each other on the slide.

MATHEW J. HOLLOWOOD.